United States Patent [19]
Mahajan

[11] Patent Number: 5,611,988
[45] Date of Patent: Mar. 18, 1997

[54] METHOD OF BLOW MOLDING A CONTAINER WITH INTEGRAL HOLLOW BASE STAND

[76] Inventor: Gautam Mahajan, 57 Jay Rd., Stamford, Conn. 06905

[21] Appl. No.: 412,001

[22] Filed: Mar. 28, 1995

Related U.S. Application Data

[62] Division of Ser. No. 907,298, Jul. 1, 1992, Pat. No. 5,400,911.

[51] Int. Cl.$^6$ ................................................. B29C 49/02
[52] U.S. Cl. ................... 264/523; 264/531; 264/532; 264/537; 264/572; 428/36.92; 428/542.8; 215/373; 425/525
[58] Field of Search .................................. 264/523, 532, 264/537, 531; 428/36.92, 542.8; 215/373, 400; 220/606; 425/525

[56] References Cited

U.S. PATENT DOCUMENTS 4,403,706  9/1983  Mahajan ................................. 264/523

FOREIGN PATENT DOCUMENTS 4-29807  1/1992  Japan ..................................... 264/572

*Primary Examiner*—Catherine Timm
*Attorney, Agent, or Firm*—William H. Holt

[57] ABSTRACT

A preform (1), a method for blow molding a bottle, and a bottle (13) formed from the preform and by the method are disclosed for use with beverages and the like wherein the bottles usually contain such beverages under pressure. The preform is shaped so that the resultant bottle is provided with a product-containing portion having a preferred hemispherical end portion and an integral bottom portion including a void therein for defining a hollow base portion (4, 12) which, in one form, contains fluid under pressure for balancing pressures related to the pressurized product. The hollow base portion provides for efficient use of material, and a minimal number of manufacturing steps, for providing a stable base for the hemispherical end portion (11) of the product containing portion of the bottle.

3 Claims, 2 Drawing Sheets

METHOD OF BLOW MOLDING A CONTAINER WITH INTEGRAL HOLLOW BASE STAND

This is a division of U.S. patent application Ser. No. 07/907,298 filed on Jul. 1, 1992 and now U.S. Pat. No. 5,400,911 granted on Mar. 28, 1995.

BACKGROUND OF THE INVENTION

Bottles used for soft drinks and pressure applications require special base designs to efficiently contain the pressure. The best design to contain the pressure is a hemispherical one, but this will not allow the bottle to stand or be handled in filling lines, or be placed upright on a shelf.

To make a hemispherical base bottle stand, a base cup is attached to the bottle. Normally such base cups are injection molded of HDPE (High Density Polyethylene) and attached to polyester bottles using hot melt adhesives. The use of base cups implies tooling to manufacture, and inventory of base cups, a separate attaching operation, alignment problems, and base cup falling off during use. In addition if colored base cups are required to match the beverage or the graphics additional inventory is required. The cost is higher because of base cups.

Recycling becomes an issue if the base cup material is different from the bottle material. For PET bottles, the base cups are HDPE causing recycling/and segregation problems.

Several novel inventions have been used to make one piece bottles to overcome the problem of base cups, and to provide pressure retention and the ability for the bottle to stand.

The most popular is the Petaloid base.

Other bases are the Conobase, (Krishnakumar et al. U.S. Pat. No. 4,108,324), the Supa base (Pocock et al. U.S. Pat. No. 4,525,401) and the champagne base, and Bartley, U.S. Pat. Nos. 5,004,109 and 5,066,081 for a skirt base. Bartley's invention has difficulty in axially stretching the skirt base and requires complex equipment.

All require additional material over a hemi-spherical base.

BRIEF SUMMARY OF THE INVENTION

The purpose of this invention is to provide a one piece base that can be used to provide a hemispherical or close to hemispherical base integral with a cup shaped stand so that the bottle can have the advantages of a hemispherical base and the base cup respectively in one base, without all the disadvantages of the detachable base cup.

Yet another advantage of this invention is that if multilayered materials are used, the base cup can be monolayered, to provide cheapness.

Yet another advantage is that while the preform can be clear (or any other color), the base cup can be colored (or have a different color) through coinjection or the base cup can be made of a different/cheaper material that adheres with PET, or is a reground PET resin, or a multilayered material with an adhesive or tie layer, compatible with the resin of the cup base and PET (or the material of the bottle).

Yet another advantage of this invention is that the base cup that is integral to the bottle can be biaxially oriented, because it is formed with the same type of stretching as is the hemispherical bottom and the bottle itself. This imparts strength and reduces weight.

In the Petaloid base, the corners of the legs thin out considerably. This is a problem particularly with multilayered materials, because this thinning can reduce the barrier properties. This problem does not exist with bases in this invention. Thus the barrier or other properties are superior.

This invention can also be used to make bottles with two compartments. In fact the air gap between the hemispherical bottom and the base cup is a compartment which can be pressurized, imparting stiffness and strength to the base cup, and reducing the pressure on the hemispherical base, thereby permitting further lightening of the hemisphere.

DETAILED DESCRIPTION OF THE INVENTION

Figure 3:
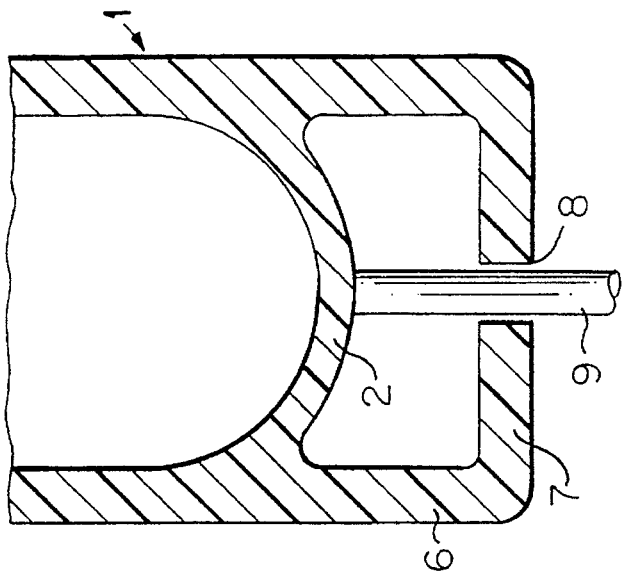
FIG. 3 is a fragmentary, vertical sectional view of a modified bottle preform having a cylindrical cup shaped base portion formed integral with the bottle preform.
Figure 2:
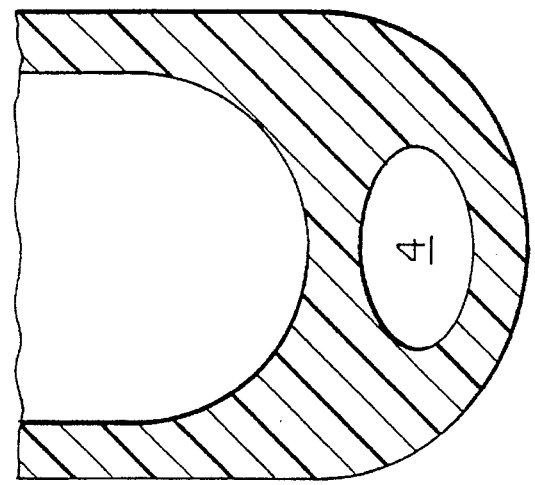
FIG. 2 is a fragmentary, sectional view of a modified bottle preform having an integral base cup including an enclosed pocket or void for containing pressurized fluid.
Figure 1:
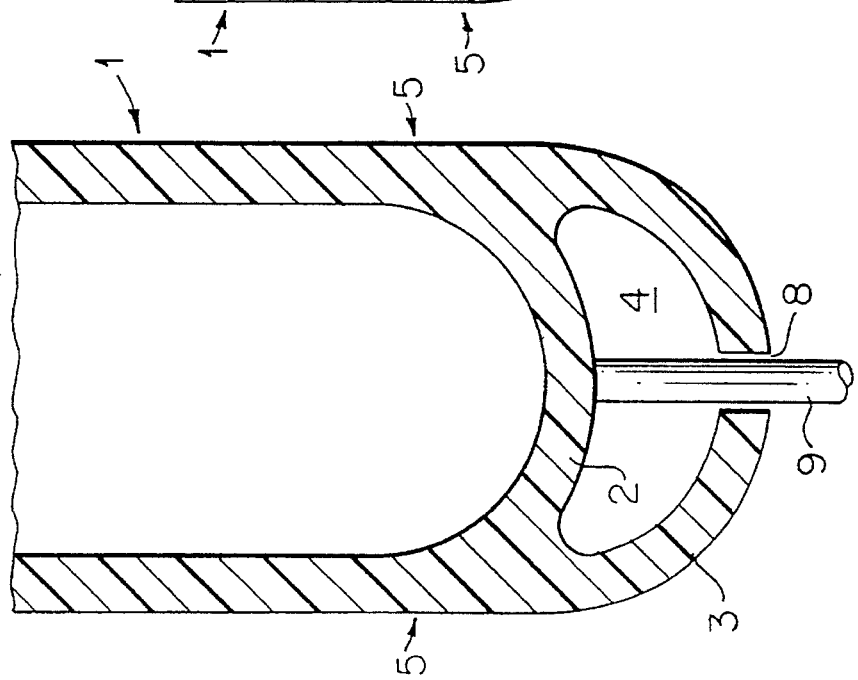
FIG. 1 is a fragmentary, vertical, section view of a bottle preform particularly for containing fluids under pressure and having a hemispherical lower wall and a base cup integrally formed therewith.

Preform body portion 1, has cylindrical end 2, with an additional cup shaped end 3 with an air gap 4. The cup shaped end 3 meets cylindrical region 1 at 5. Alternatively the cup shape can be cylindrical as shown by lines 6 and 7 in FIG. 3. FIG. 2 shows a variation of the shape of the gap and also shows that the air gap can be completely enclosed without need for an opening 8 as shown in FIG. 1.

There can be a hole in the cup if required (FIG. 1, FIG. 3) or none as in FIG. 2.

The preform is injection molded using an air molding technique that allows an air space 4 to be formed. This technique is commercially available to make items with air gaps. The air is injected into the mold before the complete filling of the mold with plastic molten material, and before the plastic is fully pressurized so as to completely fill the extremities of the mold leaving an air gap.

Figure 4:
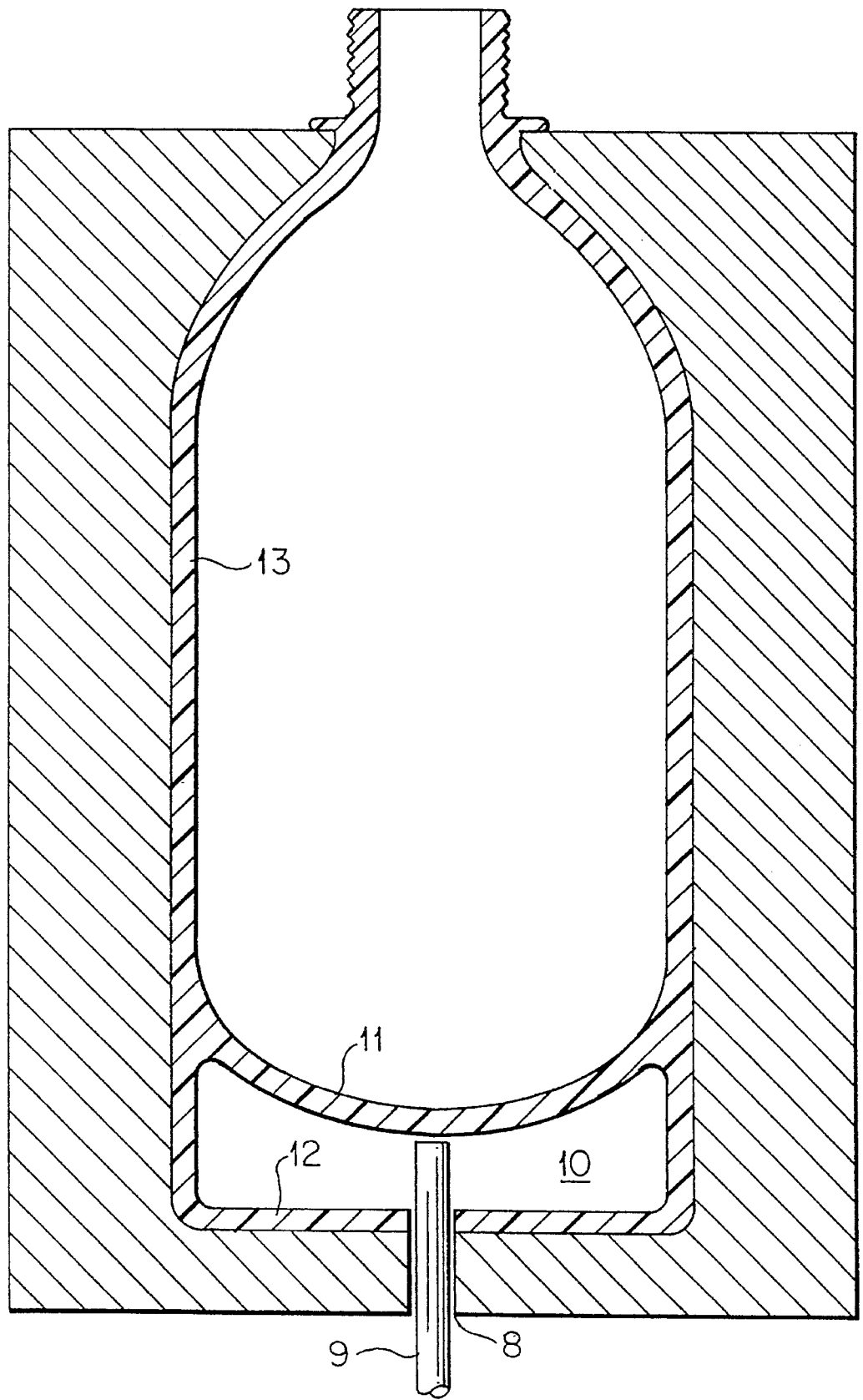
FIG. 4 is a vertical, sectional view of a bottle formed in accordance with the invention and having a hemispherical lower wall and an integral base cup including a bottom shaped to support the bottle in stable, upright position.

The bottle can be blown by having a base support rod 9 (FIG. 1, FIG. 3) that supports the preform on the inside surface 2, as it is blown. This also helps center the preform and subsequently the hemispherical bottom of the bottle. Simultaneously air pressure can be put into cavity 4 to blow cup shaped end 3 into place, as shown in FIG. 4). Normally this secondary pressure is initially higher than the bottle blowing pressure so that the air gap can become larger. Also at the final stages the base cup must be formed in the blow mold cavity and the hemispherical base must be kept above the bottom of the base cup. Apart from this reason, the air pressure causes the base cup to acquire a biaxial stretch, thereby making it stronger and potentially lighter. Depending on the thickness of the preform and the relative temperatures of the plastic in the base cup and the bottom of the preform, the air pressure in the air gap has to be varied to give the desired shape to the bottom 7 in FIG. 3 or to the bottom 12 in FIG. 4.

Another method of forming the base cup is by using finger mechanisms attached to rod 9 that expand during the blowing step, thus forming the base. There can be air assist if necessary. These fingers can expand the base, and even pull it, provided the resistance to pulling is less than in the body of the preform. This resistance is a function of the temperature and the thickness of the plastic. Air under pressure can be introduced to assist the fingers to accomplish the forming of the base cup.

The fingers or the differential pressure helps maintain a gap 10 between the hemisphere 11 and the base cup which is formed in the mold (FIG. 4). Alternatively, a bottom rod 9 can be used to maintain the gap (FIG. 2). The base gets biaxially stretched this way during formation thereby imparting strength. An alternative is to introduce a blow pin without a bottom rod, such that the formed base has an enclosed air gap in it when pressurized air is sent through the blow pin. In this case it is possible to use a rubber valve inserted in the base cup to retain air pressure in the air gap.

One advantage of this kind of a base is that all the air in the air gap 10 does not need to be evacuated. Let us assume we leave 15 psi (pounds per square inch) of pressure in the space. If the soft drink exerts 60 psi of pressure, the net pressure on the base is 45 psi, thus reducing stress and allowing thinning of the hemisphere. Also this air can provide a cushioning effect for impact and mishandling and can provide rigidity to the base.

Another variation is to have a preform with a cup molded with it.

This has the advantage of allowing the preform to self center and the base to be in place while blowing the bottle. The disadvantage is that the spacing between preforms in the multicavity molds is increased, as also the separation force in the mold, requiring larger clamping tonnage.

However, for the one step PET process, this may be a very acceptable method of making the base. In these processes the injection mold centers are dictated by the bottle centers, and the preform is directly converted into a bottle in the same machine making preforms.

The base cup can be of a different material than the bottle receiving portion 13, of FIG. 4, by using coinjection techniques.

The teachings of this invention can be extended to extrusion blow molding of bottles, where two pinch offs are required causing an air gap between them.

I claim:

1. A method of forming a bottle for containing fluids therein, said method comprising the steps of forming a preform including a body portion having a mouth portion and a closed generally hemispherical end portion and a bottom defining portion including a void (4), forming said bottom defining portion integral with said body portion and connected thereto adjacent to and underlying said closed hemispherical end portion, and blow molding said preform and thereby forming a bottle having a product receiving portion with a closed generally hemispherical end portion and a hollow base portion with a flat bottom surface (12), said hollow base portion being integral with said product receiving portion.

2. A method of forming a bottle for containing fluids therein, said method comprising the steps of forming a preform including a body portion having a mouth portion and a closed generally hemispherical end portion and a bottom defining portion including a void (4), forming said bottom defining portion integral with said body portion and connected thereto adjacent to and underlying said closed hemispherical end portion, and blow molding said preform and thereby forming a bottle having a product receiving portion with a closed generally hemispherical end portion and a hollow base portion with a flat bottom surface (12), said hollow base portion being integral with said product receiving portion; including the step of providing fluid under pressure in said void during said blow molding for applying pressure to said generally hemispherical end portion.

3. A method of forming a bottle for containing fluids therein, said method comprising the steps of forming a preform including a body portion having a mouth portion and a closed generally hemispherical end portion and a bottom defining portion including a void (4), forming said bottom defining portion integral with said body portion and connected thereto adjacent to and underlying said closed hemispherical end portion, blow molding said preform and thereby forming a bottle having a product receiving portion with a closed generally hemispherical end portion and a hollow base portion integral with said product receiving portion, and including the step of introducing a secondary fluid into said void during said blow molding for applying pressure to an traderside of said generally hemispherical end portion for counteracting pressure within said product receiving portion, and including the step of forming a hollow base portion with a flat bottom surface integral with said product receiving portion.

\* \* \* \* \*